United States Patent
Tarekado et al.

[11] Patent Number: 5,186,126
[45] Date of Patent: Feb. 16, 1993

[54] INTAKE APPARATUS FOR INTERNAL COMBUSTION ENGINE

[75] Inventors: Kenji Tarekado; Masanori Nakamura; Kazuaki Hokazono; Hirotaka Fukada; Takashige Ishikawa, all of Hiroshima, Japan

[73] Assignee: Mazda Motor Corporation, Hiroshima, Japan

[21] Appl. No.: 676,579

[22] Filed: Mar. 29, 1991

[30] Foreign Application Priority Data

Nov. 28, 1990 [JP] Japan .................. 2-332262
Mar. 29, 1991 [JP] Japan .................. 2-86333

[51] Int. Cl.$^5$ ........................... F02M 35/00
[52] U.S. Cl. .................. 123/52 MB; 123/52 MC
[58] Field of Search ......... 123/52 M, 52 MV, 52 MB, 123/52 MC, 52 MF

[56] References Cited

U.S. PATENT DOCUMENTS

| 4,957,071 | 9/1990 | Matsuo et al. | 123/52 MV |
| 4,981,115 | 1/1991 | Okasako et al. | 123/52 MV |

FOREIGN PATENT DOCUMENTS

| 2591665 | 6/1987 | France | 123/52 MV |
| 0048922 | 3/1987 | Japan | 123/52 M |
| 62-91621 | 4/1987 | Japan | |
| 0066417 | 3/1989 | Japan | 123/52 M |
| 0119619 | 5/1990 | Japan | 123/52 M |
| 2052634 | 1/1981 | United Kingdom | 123/52 M |

*Primary Examiner*—David A. Okonsky
*Attorney, Agent, or Firm*—Keck, Mahin & Cate

[57] ABSTRACT

An intake system distributes air into cylinders of an internal combustion engine, which are divided into two groups. The cylinders in each group are arranged in the same row so that adjoining cylinders in each row do not fire one after another. An intake passage is formed with an upstream passage and two separate downstream passages, extending from the upstream passage, which are connected to the two groups of cylinders. The upstream passage is divided by a partition wall into two separate upstream passages in communication with the two separate downstream passages, respectively. A throttle valve is disposed adjacent to the intake passage so as to extend a path of each separate upstream passage when the throttle valve is in its full throttle position.

9 Claims, 5 Drawing Sheets

INTAKE APPARATUS FOR INTERNAL COMBUSTION ENGINE

BACKGROUND OF THE INVENTION

1. Field of the Invention

The present invention relates to an intake system for an internal combustion engine, and, more particularly, to an intake system improved by utilizing resonance effects of intake air.

2. Description of Related Art

A known internal combustion engine has been developed with improved charging efficiency obtained by utilizing resonance effects of intake air. Typically, an intake system for supercharging by utilizing the resonance effects of intake air is used for an internal combustion engine which has a plurality of cylinders divided into two groups, the cylinders in each group being disposed so that adjoining cylinders in each cylinder group do not fire one after another. Individual, or discrete, intake passages of the cylinders of each cylinder group are joined together at their upper ends by a conflux chamber, such as a surge tank. The surge tank is connected to what is known as a collection intake passage, or resonant passages, with a pressure reverse portion formed at a desired location of the resonant passage.

In a tuned speed range of the engine, fundamental pressure waves of intake air, generated at intake ports of the cylinders of each cylinder group, and reflected pressure waves, reversed at the pressure reverse portion, coincide with one another in phase so as to cause the pressure waves of intake air, propagating both ways between the pressure reverse portion and each cylinder, to resonate in the resonance passage. In such a way, a resonant pressure wave, having a high amplitude, is generated by means of the resonance of intake air due to pressure vibrations generated individually in the cylinders. The resonant pressure wave thus obtained forces the intake air to be charged into a combustion chamber of each cylinder with high charging efficiency. Such an intake system is known from, for instance, Japanese Unexamined Patent Publication No. 62-91621.

In an engine with the prior art intake system which provides resonant effects, there are somewhat conflicting requirements that govern the length of intake passage and the size of engine. That is, the intake passage is required to be sufficiently great in length to provide desired resonant effects, and yet the engine desirably must be as small in size as possible.

SUMMARY OF THE INVENTION

A primary object of the present invention is to provide an intake system for an internal combustion engine which can provide desired resonance effects by utilizing a throttle valve provided in an intake passage, while keeping the engine small in size.

In order to achieve this object, the intake system according to the present invention delivers, or charges, air into a plurality of cylinders of an internal combustion engine, which are divided into first and second groups. In each group of cylinders, which is arranged the same row, adjoining cylinders do not fire one after another. The intake system includes intake passage means which has an upstream passage portion and two separate downstream passage portions, extending from the upstream passage portion, which are connected to the two groups of cylinders, respectively.

The upstream passage portion is divided, by a partition wall disposed in the intake passage means, into two separate upstream passage portions in communication with the two separate downstream passage portions, respectively. A throttle valve means, for controlling air flow into the intake passage means, is disposed in common passage means connected to the upstream passage portion of the intake passage means so as to extend a path of each separate upstream passage portion when the throttle valve means is in its full throttle position.

The common passage means may further comprise an intake duct connected to the throttle body and a partition wall extension disposed in the intake duct. The partition wall extension divides the common passage partly into two separate passage portions which are communicated with the two separate upstream passage portions of the intake passage means, respectively, when the throttle valve means is in its full throttle position, thereby extending the path of each separate upstream passage portion on both sides of the throttle body.

In the intake system according to the present invention, pressure waves of intake air, propagating both ways between an upstream end of each intake passage, having a portion adjacent to the upstream end as a pressure inversion portion, and the respective cylinders, resonate within the intake passages.

Due to the extension of the intake passage by the throttle valve, and, more specifically, by a length of the throttle valve, the speed of engine for synchronizing the resonance of intake air is changed toward lower speeds. Therefore, resonant effects can be obtained in a range of lower engine speeds, in which the engine is apt not to provide sufficient output power when the engine operates with the throttle valve in its full throttle position in a range of higher loads, so as to provide an increase in engine torque at lower engine speeds.

Due to the use of the throttle valve, which itself is essential to a gasoline engine, in order to extend the intake passage, there is no necessity of increasing the length of the intake passage, and the engine is, therefore, kept compact.

BRIEF DESCRIPTION OF THE DRAWINGS

Still other objects of the present invention and more specific features will become apparent to those skilled in the art from the following description of the preferred embodiments when considered together with the accompanying drawings, wherein similar reference numbers have been used to denote the same or similar elements throughout the drawings, and in which.

DETAILED DESCRIPTION OF THE PREFERRED EMBODIMENT

Figure 1:
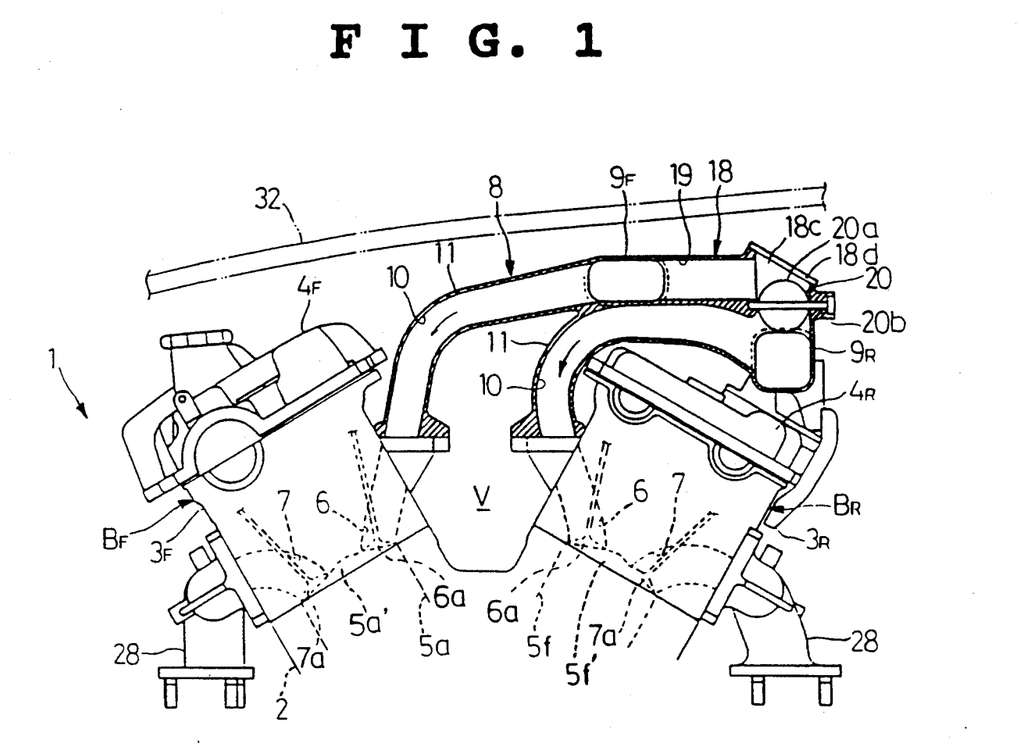
FIG. 1 is a side view showing, partly in cross section, part of a V-type internal combustion engine with an intake system in accordance with a preferred embodiment of the present invention.
Figure 2:
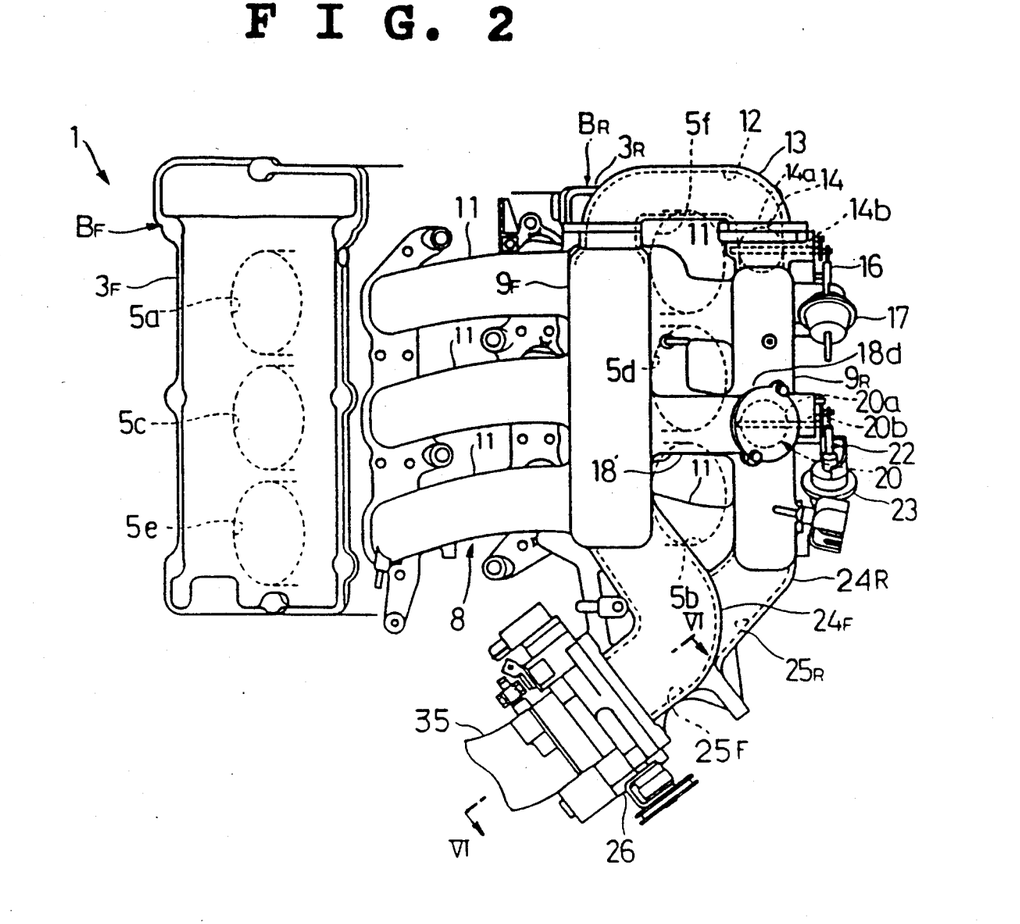
FIG. 2 is a plan view of FIG. 1.

Referring to the drawings in detail, and particularly, to FIGS. 1 and 2, a V-type, six-cylinder, internal combustion engine with an intake system in accordance with a preferred embodiment of the present invention is shown. The V-type, six-cylinder, internal combustion engine 1 (which is referred hereinafter to as an engine for simplicity) is mounted on the chassis of a car body (not shown) with its output axle (not shown) directed transversely with respect to the vehicle, and is located under a bonnet 32. The engine 1 consists of left, or front, and right, or rear, cylinder banks BF and BR, arranged in a V-formation and at a predetermined relative angle, for instance, a relative angle of 60 degrees. The No. 1, No. 3 and No. 5 cylinders 5a, 5c and 5e are formed in the front cylinder bank BF, and the No. 2, No. 4 and No. 6 cylinders 5b, 5d and 5f are formed in the rear cylinder bank BR. The No. 1 cylinder 5a, the No. 6 cylinder 5f, the No. 3 cylinder 5c, the No. 4 cylinder 5d, the No. 5 cylinder 5e and the No. 2 cylinder 5b are fired in order. That is, the cylinders 5a to 5f are divided into two groups, and the cylinders in each group are disposed in one and the same cylinder banks BF or BR, respectively, so that adjoining cylinders in each cylinder bank BF or BR do not fire one after another.

The cylinders 5a to 5f are, respectively, provided with intake ports 6, each having an opening which extends toward a V-shaped space V between the front and rear cylinder banks BF and BR. Further, the cylinders 5a to 5f are, respectively, provided with exhaust ports 7, each having an opening which extends into exhaust pipes 28 attached to the sides of the corresponding cylinder banks BF and BR remote from the V-shaped space V.

The engine 1 has a cylinder block 2. A left, or front, cylinder head 3F is mounted on the cylinder block 2 and provides for the front cylinder bank BF, and a right, or rear, cylinder head 3R is mounted on the cylinder block 2 and provides for the rear cylinder bank BR. Cylinder head covers 4F and 4R are provided to cover the upper portions of the front and rear cylinder heads 3F and 3R, respectively. Combustion chambers 5a' to 5f' are formed in the tops of the cylinders 5a to 5f, respectively. The intake ports 6 and the exhaust ports 7 open into each combustion chamber, and are opened and shut at a predetermined timing by intake valves 6a and exhaust valves 7a, respectively.

Above the engine 1 there is arranged an intake manifold 8 typically formed by casting. This intake manifold 8 is provided with a front, or left, conflux chamber, such as an elongated surge tank 9F, and a rear, or right, conflux chamber, such as an elongated surge tank 9R, for, and corresponding to, the front and rear cylinder banks BF and BR, respectively. Both the surge tanks 9F and 9R are disposed above the rear cylinder bank BR, and extend parallel to each other in a lengthwise direction of the cylinder banks BF and BR, i.e., in the axial direction of the output axle of the engine 1. Specifically, the front surge tank 9F is disposed upward of, i.e., above the front end of the cylinder head cover 4R of the rear bank BR, and the rear surge tank 9R is disposed at a height lower than the front surge tank 9F upwards of the downstream end of the cylinder head cover 4R. The front surge tank 9F is integrally formed with three discrete intake pipes 11, defining air passages 10 therein, respectively, which are arranged at equal spacings on the front side of the front surge tank 9F. Each intake pipe 11, after extending forward between the front and rear cylinder banks BF and BR, curves downwards and is connected at its end to each corresponding air intake port 6 of the front cylinder head 3F. Similarly, the rear surge tank 9R is integrally formed with three discrete intake pipes 11, defining air passages 10 therein, respectively, which are arranged at equal spacings on the front side of the rear surge tank 9R. Each discrete intake pipe 11, after extending forward between the front and rear cylinder banks BF and BR, curves downwards and is connected at its end to each corresponding air intake port 6 of the rear cylinder head 3R. The front surge tank 9F is located on, and structurally joined with, the upper surfaces of these three discrete intake pipes 11 for the rear surge tank 9R. All the intake pipes 11 are made short, and equal to one another, in length. These surge tanks 9F and 9R constitute parts of collection intake passages 25, respectively, which will be described in detail later.

Figure 3:
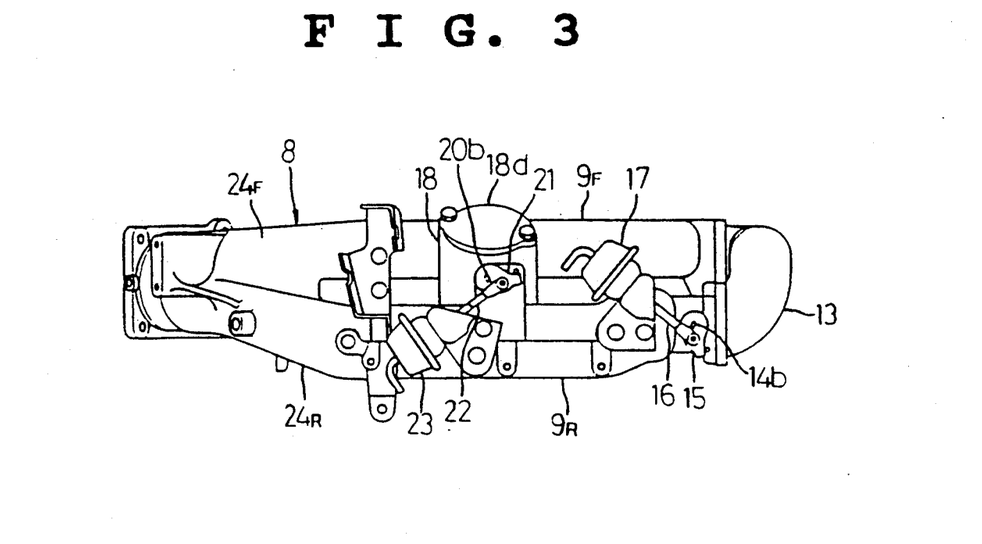
FIG. 3 is a rear view showing an intake manifold of the intake system.

As is shown in FIGS. 2 and 3, the right-hand end portions of the respective surge tanks 9F and 9R are communicated with each other by a first communication means, such as a communication pipe 13 defining therein a communication passage 12. The rear surge tank 9R is provided with a first changeover valve 14 consisting of a butterfly valve, for changing over between connection and disconnection of the front and rear surge tanks 9F and 9R, connected to the right-hand end thereof where the first communication pipe 13 is connected. The changeover valve 14 has a valve body 14a secured to a valve shaft 14b which extends in a lengthwise direction of the car body. The rear end of the valve shaft 14b protrudes through the rear wall of the rear surge tank 9R and is coupled at its rear end to a negative pressure operated actuator 17 via a lever 15 and a rod 16 (see FIG. 3). The changeover valve 14 is opened by the operation of the negative pressure operated actuator 17. Both the surge tanks 9F and 9R, at the approximately middle portions in the lengthwise direction thereof, are interconnected by a second communication passage means, such as a communication pipe 18, which is made integrally with both the surge tanks BF and BR, defining therein a communication passage 19.

Figure 4:
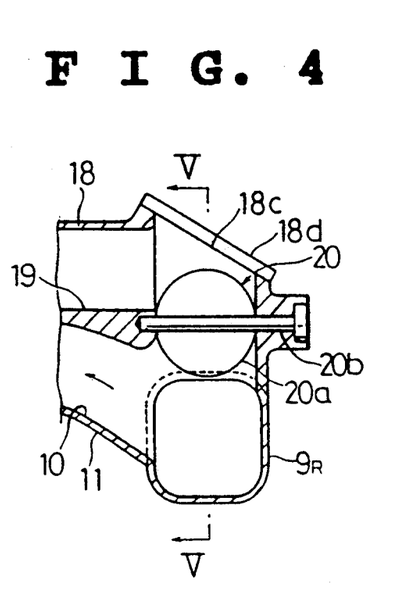
FIG. 4 is an enlarged cross-sectional view showing part of the intake manifold of FIG. 3 surrounding a second changeover valve.
Figure 5:
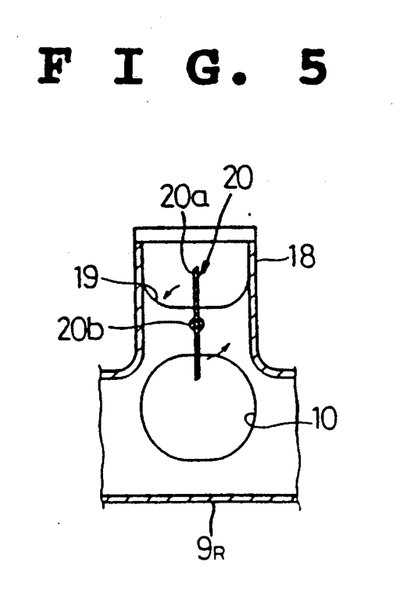
FIG. 5 is a cross-sectional view of FIG. 2 as seen along line V—V.

As is seen more clearly in FIGS. 4 and 5, showing, in detail, a mounting structure of the second communication pipe 18, the rear portion of the second communication pipe 18 is a turned-down, approximately L-shaped pipe member, forming therein the communication passage 19. A second changeover valve 20, consisting of a butterfly valve, is disposed in the rear portion of the second communication pipe 18 to open and close the communication passage 19. The changeover valve 20 has a valve body 20a secured to a valve shaft 20b which extends in the lengthwise direction of the car body. The rear end of the valve shaft 20b protrudes through the rear wall of the communication pipe 18 and is connected to a negative pressure operated actuator 23 via a lever 21 and rod 22 (see FIG. 3). The changeover valve 20 is opened by the operation of this actuator 23. The second communication pipe 18 is formed with an opening 18c in the upper portion thereof to dispose the valve body 20a of the second changeover valve 20 in the opening 18c. This opening 18c is closed air-tightly by a conventional cover 18d.

First and second changeover valves 14 and 20 are controlled to open and close the communication passages 12 and 19, respectively, according to engine speeds. That is, both the changeover valves 14 and 20 are kept closed in a range of lower engine speeds of the engine 1 and are opened in a range of higher engine speeds, but only the first valve 14 is opened in a medium range of engine speeds.

Referring back to FIG. 2, a front resonant passage means, such as a collecting pipe 24F, defining therein a resonant passage 25F, is connected at its downstream end to the left-hand end of the front surge tank 9F, and a rear resonant passage means, such as a collection pipe 24R, defining therein a resonant passage 25R, is connected at its downstream end to the left-hand end of the rear surge tank 9R. The upstream ends of the respective collection pipes 24F and 24R are connected to a throttle body 26 so as to join the resonant passages 25F and 25R together. That is, the rear collection pipe 24R extends in a straight line obliquely left and forward from the left-hand end of the rear surge tank 9R so that the central axis of the rear collection pipe 24R and the center line of the passage of the throttle body 26 coincide. On the other hand, as is shown in FIG. 2, the front collection pipe 24F, extending obliquely rearward left from the left-hand end of the front surge tank 9F and then curving obliquely forward left, is located above the rear collection pipe 24R. As is clearly shown in FIGS. 2, 3 and 6, the front and rear collection pipes 24F and 24R are joined together at their upstream ends so as to superimpose the resonant passages 25F and 25R, both having semicircular cross-sections divided by a partition wall 30, one above the other. The throttle body 26, at the juncture with the front and rear collection pipes 24F and 24R, is provided therein with a throttle valve 27, consisting of a butterfly valve, supported for turning by a shaft 27a. The throttle valve 27 is swingable between a full throttle position shown by chained line and idle position shown by solid line in FIG. 6, according to engine loads. At the full throttle position, the throttle valve 27 is in the same plane as the partition wall 30 and is positioned end to end with respect to the same. The throttle body 26 is connected to an intake duct 35, defining therein a passage 36, through a hub 26a.

The full length of intake passage from the upstream end of the throttle valve 27 to each cylinder is designed and adapted to meet lower engine speeds for synchronizing the resonant effect in a range of higher engine loads where the throttle valve 27 is in the full throttle position.

In the intake system thus constructed, the resonance effect of intake air takes place in the lower and medium engine speed ranges, so as to increase the quantity of intake air charged to each cylinder 5 and thereby increase the output torque of the engine 1. In other words, according to the ranges of engine speeds, such as lower engine speed, medium engine speed and higher engine speed ranges, the first and second changeover valves 14 and 20 are selectively opened and closed to adjust engine speed at which the synchronization of resonance effects is provided. Then, when the engine 1 operates in the range of lower speeds, both the first and second changeover valves 14 and 20 are closed, so as to lower the engine speed for the synchronization of resonant effects. In this state, the location at which the fundamental pressure waves of intake air generated at the intake port 6 of each cylinder inverts is inside the throttle body 26 at the upstream ends of the resonant passages 25F and 25R. Therefore, the pressure waves of intake air propagating both ways between the throttle body 26 and each cylinder 5 resonate in the resonant passages 25F and 25R so as to generate resonant pressure waves having a large amplitude, due to vibration of the pressure waves generated individually for each cylinder 5 by means of the resonance, and thereby supply the intake air into the combustion chambers of the cylinders 5 with increased charging efficiency. By this, the engine 1 increases its output torque in the range of lower engine speeds.

When the engine 1 operates in the range of medium speeds, while the second changeover valve 20 remains closed, the first changeover valve 14 opens, so as to open the connecting passage 12 in the first communication pipe 13. As a result, engine speeds suitable for the synchronization of resonant effects are changed to speeds in the medium range. In this state, the location at which the fundamental pressure waves of intake air generated at the intake port 6 of each cylinder 5 invert is in the communication passage 12 in the first communication pipe 13, so that the pressure wave of intake air propagating both ways between the communication passage 12 and each cylinder 5 resonates in the intake passage. By means of this resonant pressure waves, the intake air is charged into the combustion chambers of the cylinders with increased charging efficiency, and, thereby, the engine 1 increases its output torque also in the range of medium engine speeds.

Further, when the speed of the engine 1 changes into the range of higher speeds, the first and second changeover valves 14, 20 are both opened, and the respective communication passages 12 and 19 of the first and second communication pipes 13 and 18 are opened. In this state, because both the surge tanks 9F and 9R are mutually communicated at approximate middle portions in the lengthwise direction by the communication passage 19 of the second communication pipe 18, and a large increase in volume is provided by these surge tanks 9F and 9R and the communication pipe 18, the above-mentioned resonance effects vanish in the range of lower and medium engine speeds. Because of this, a drop in output torque at engine speeds other than the synchronizing engine speeds, which adversely affects resonant effects, is assuredly prevented, resulting in a reduced torque trough. As is apparent from the above description, the output torque of the engine 1 can be increased throughout both the range of lower engine speeds and the range of higher engine speeds.

Figure 6:
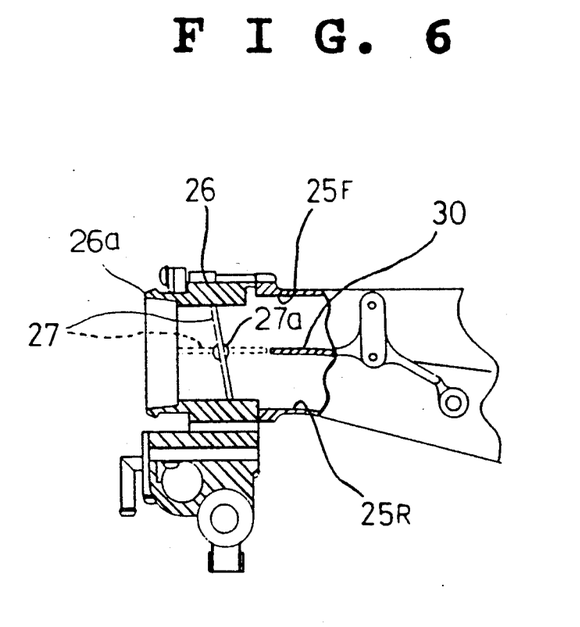
FIG. 6 is a cross-sectional view of FIG. 2 as seen along line VI—VI.
Figure 7:
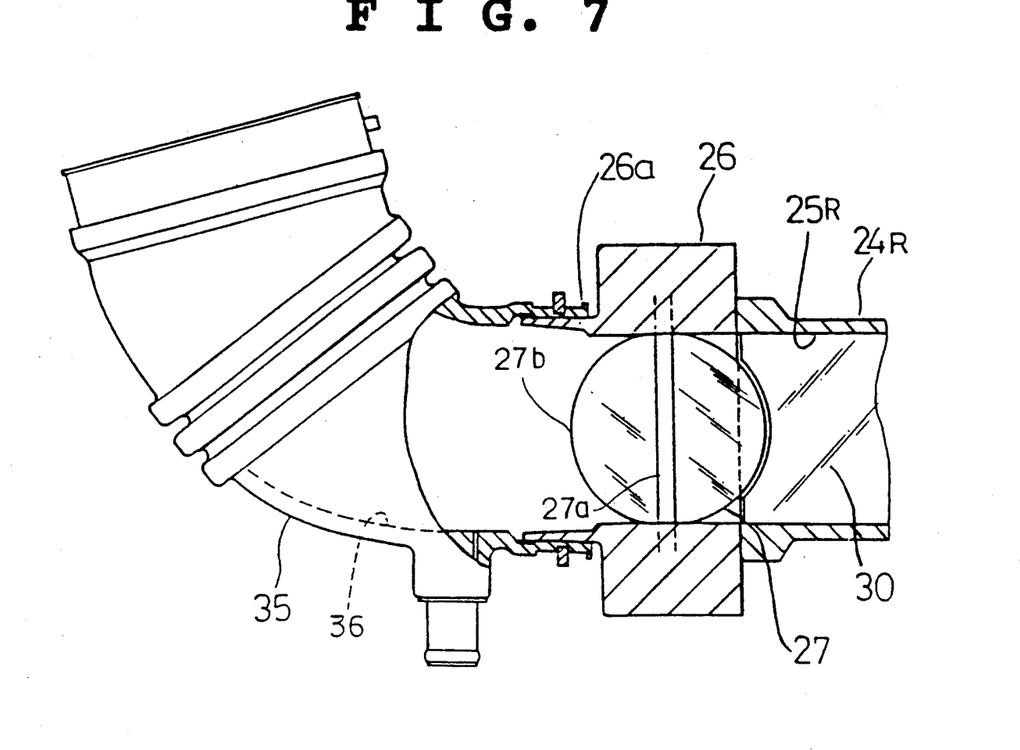
FIG. 7 is a cross-sectional view of FIG. 6 as seen along line B—B.

Due to the structure in which the throttle valve 27 becomes an extended part of the partition wall 30 positioned adjacent to the upstream end of the partition wall 30 in the full throttle position, if the engine operates in the range of lower speeds, both the first and second changeover valves 14 and 20 are closed, so as to provide resonant effects corresponding to the full length of intake passage defined between the upstream end 27a of the throttle valve 27 and each cylinder. As was previously described, because the full length of intake passage from the upstream end of the throttle valve 27 to each cylinder is designed and adapted to meet lower engine speeds for synchronizing the resonant effects in a range of higher engine loads where the throttle 27 is in the full throttle position, the effects of resonance are achieved at lower engine speeds in the range of higher engine loads, so as to provide an increase in engine output torque at lower engine speeds, and further to shorten the partition wall 30 for the intake passage by the length of the throttle valve 27. This results in maintaining the compactness of the engine 1.

Furthermore, because the collection pipe 24R extends in a straight line obliquely outside and forward from the left-hand end of the rear surge tank 9R, and the front collection pipe 24F extends obliquely outside and rearward from the left-hand end of the front surge tank 9F and then gently curves obliquely forward, and because both the front and rear collection pipes 24F and 24R have their center lines passing through the center of the throttle body 26, the intake flow resistance between the throttle body 26 and each collection pipe 24F or 24R is decreased, and the distribution of intake air to the front and rear collection pipes 24F and 24R is improved.

Moreover, due to the structure in which the second communication pipe 18 curves in a vertical plane and in which the valve shaft 20b of the second changeover valve 20 extends in the lengthwise direction of the car body, i.e., in a vertical plane including the central axis of the second communication pipe 18, despite the presence of a curved portion in the communication pipe 18, the communication passage 19 can be made large in cross sectional area when the changeover valve 20 is open and the resistance of intake air can be favorably reduced.

Figure 8:
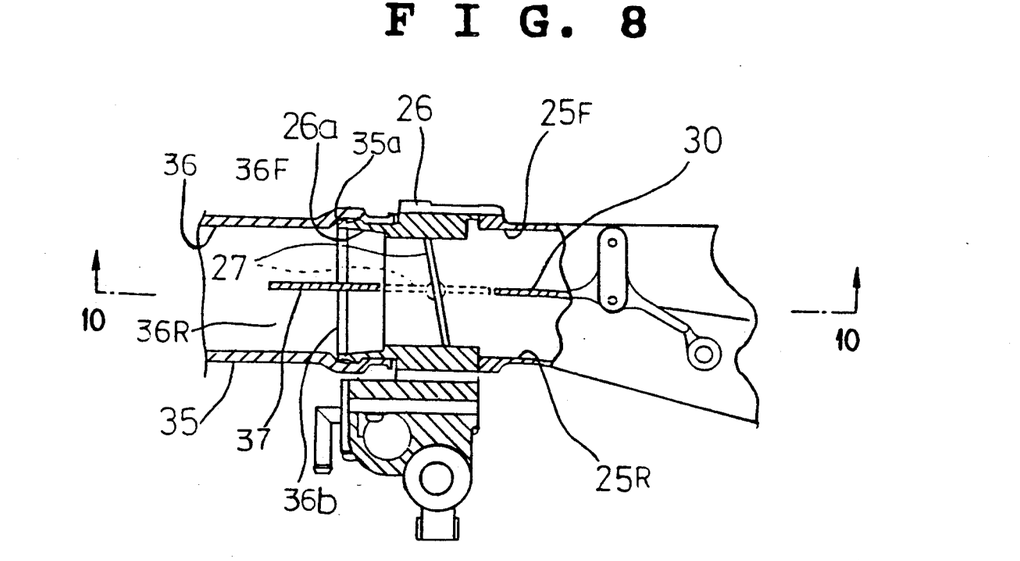
FIG. 8 is a cross-sectional view, similar to FIG. 6, showing an intake system in accordance with another preferred embodiment of the present invention.
Figure 9:
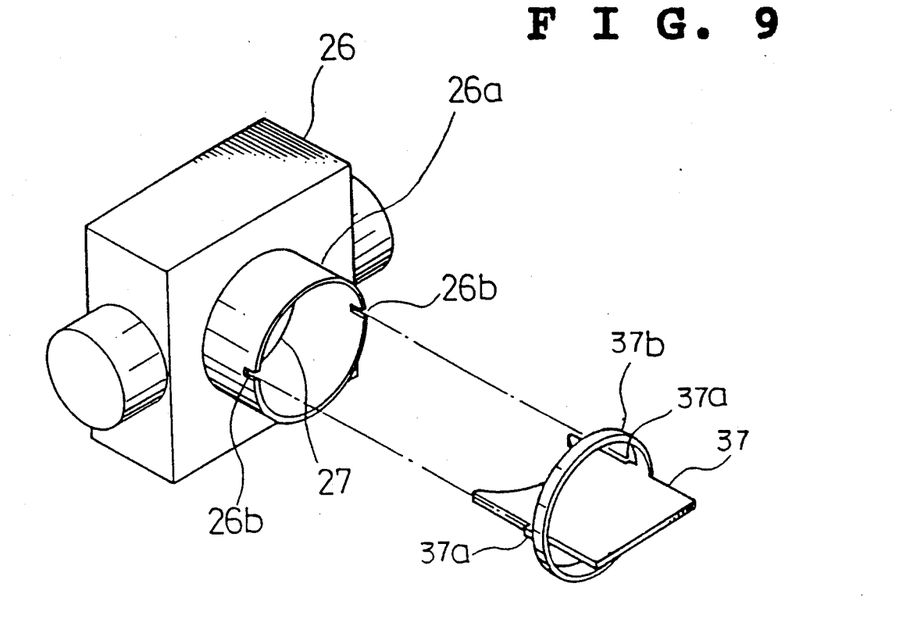
FIG. 9 is an exploded perspective view showing a throttle body and a partition wall.
Figure 10:
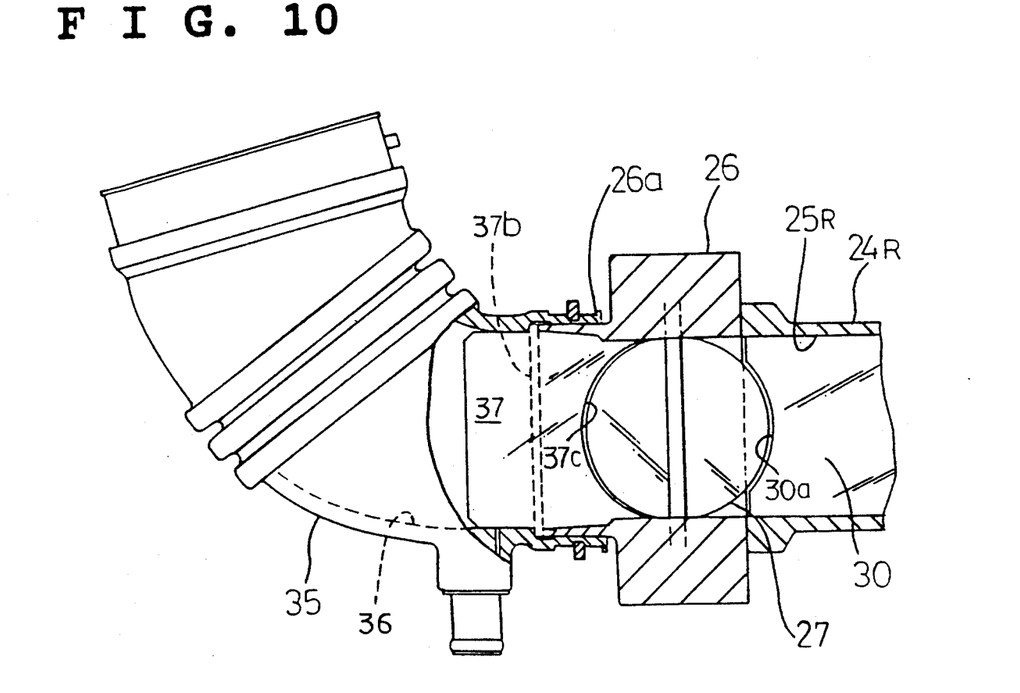
FIG. 10 is a cross-sectional view of FIG. 8 as seen along line 10—10.

In addition, because the front and rear resonant passages 25F and 25R are located superposed one above the other, as compared with a case in which they are arranged side by side in a substantially horizontal plane, both the front and rear resonant passages 25F and 25R can be separated up to the vicinity of the throttle body 26, so that each resonant passage 25F or 25R is allowed to have a large curvature, and, thereby the resistance to intake air is reduced. Referring to FIGS. 8 to 10, a V-type, six-cylinder, internal combustion engine with an intake system in accordance with another preferred embodiment of the present invention is shown, comprising a different partition wall structure from the structure of the intake system of the previous embodiment.

Front and rear collection pipes 24F and 24R are joined together at their upstream end portions so as to superimpose the resonant passages 25F and 25R, both having semicircular cross-sections divided by a partition wall 30, one above the other. The throttle body 26, at the juncture with the front and rear collection pipes 24F and 24R, is provided with a throttle valve 27, consisting of a butterfly valve and supported for turning by a shaft 27a. The throttle valve 27 is swingable between a full throttle position, shown by chained line, and idle position, shown by solid line, in FIG. 8, according to engine loads. The throttle body 26 is connected to an intake duct 35, defining therein a passage 36, through a hub 26a. The intake duct 35 is provided with a partition wall extension 37 by which the downstream end portion of the intake duct 35 is divided into upper and lower passages 36F and 36R so as to communicate with the resonant passages 25F and 25R, respectively. In the full throttle position, the throttle valve 27 is in the same plane as both the partition wall 30 and the partition wall extension 37 and is positioned between, and end to end with respect to, the same.

As is shown in FIG. 9, the partition wall extension 37 is formed integrally with side projections 37a and a ring 37b. For installing the partition wall extension 37, the side projections 37a of the partition wall extension 37 are inserted into notches 26b formed in the hub 26a of the throttle body 26 until the ring 37b abuts against the end surface of the hub 26a. Then, the intake duct 35 is fitted onto the hub 26a so as to push the ring 37b with an inner shoulder 35a of the intake duct 35. As is shown in FIG. 10, each of the partition wall 30 and the partition wall extension 37 are formed with semi-circular recesses 30a and 37c at one end adjacent to the throttle valve 27.

In this embodiment, in the full throttle position, the throttle valve 27 intercommunicates the front and rear resonant passages 25F and 25R and the upper and lower passages 36F and 36R, respectively. The full length of the intake passage from the upstream end of the partition wall extension 37 to each cylinder is designed and adapted to meet a length for the synchronization of resonant effects at lower engine speeds in a range of higher engine loads. Accordingly, an increase in engine output torque is realized at lower engine speeds.

It is to be understood that although the invention has been described in detail with respect to preferred embodiments thereof, nevertheless, various other embodiments and variants are possible which are within the scope and spirit of the invention, and such other embodiments and variants are intended to be covered by the following claims.

What is claimed is:

1. An intake system having a throttle body for delivering air into a plurality of cylinders of an internal combustion engine, the cylinders being divided into two groups, the cylinders in each group being arranged in a same row so that adjoining cylinders in each row do not fire one after another, said intake system comprising:
   an intake passage having an upstream passage portion, two separate downstream passage portions, and common passage means for interconnecting said upstream passage portion and said downstream passage portions, said two separate downstream passage portions extending from said common passage means and being connected to said two groups of cylinders, respectively;
   a partition wall disposed in said intake passage so as to divide each downstream passage portion into two separate downstream passage portions in communication with said two groups of cylinders; and
   throttle valve means for controlling air flow through said intake passage, said throttle valve means being disposed in said common passage means so as to extend upstream each of said separate downstream passage portions when said throttle valve means is in its full throttle position.

2. An intake system as defined in claim 1, wherein said intake passage comprises an intake pipe branching off into two parts forming said separate downstream passage portions, said intake pipe having a circular cross-section before branching off.

3. An intake system as defined in claim 2, wherein said partition wall comprises a flat plate so as to form each separate downstream passage portion with a semi-circular cross-section.

4. An intake system as defined in claim 3, wherein said common passage means is formed at least partly by a throttle body in which said throttle valve means is provided.

5. An intake system as defined in claim 4, wherein said throttle valve means comprises a butterfly valve swingably supported so as to be positioned with its periphery adjacent to an end of said partition wall and almost even with said partition wall in said full throttle position.

6. An intake system as defined in claim 4, wherein said common passage means is further formed by an intake duct connected to the throttle body.

7. An intake system as defined in claim 6, wherein said common passage means further comprises a partition wall extension disposed in said intake duct so as to partly divide said common passage into two separate passage portions which are communicated with said two separate downstream passage portions of said intake passage, respectively, when said throttle valve means is in its full throttle position.

8. An intake system as defined in claim 7, wherein said partition wall extension comprises a flat plate so as to attach each of said separate downstream passage portions with a semi-circular cross-section to the throttle body.

9. An intake system as defined in claim 8, wherein said flat plate is attached to the throttle body.

* * * * *